United States Patent
Gilstad et al.

(10) Patent No.: US 8,708,306 B2
(45) Date of Patent: Apr. 29, 2014

(54) TUNABLE VALVE ASSEMBLY

(71) Applicants: Barbara C. Gilstad, San Antonio, TX (US); Dennis W. Gilstad, San Antonio, TX (US)

(72) Inventors: Barbara C. Gilstad, San Antonio, TX (US); Dennis W. Gilstad, San Antonio, TX (US)

(*) Notice: Subject to any disclaimer, the term of this patent is extended or adjusted under 35 U.S.C. 154(b) by 0 days.

(21) Appl. No.: 14/038,819

(22) Filed: Sep. 27, 2013

(65) Prior Publication Data

US 2014/0021398 A1  Jan. 23, 2014

Related U.S. Application Data

(63) Continuation-in-part of application No. 13/525,374, filed on Jun. 18, 2012, now Pat. No. 8,550,425, and a continuation-in-part of application No. 13/228,475, filed on Sep. 9, 2011, now abandoned, and a continuation-in-part of application No. 13/210,407, filed on Aug. 16, 2011, now Pat. No. 8,292,260, and a continuation-in-part of application No. 13/196,916, filed on Aug. 3, 2011, now Pat. No. 8,267,371.

(51) Int. Cl.
  *F16K 31/00*  (2006.01)
(52) U.S. Cl.
  USPC ............... 251/64; 251/77; 251/318; 251/334; 251/363; 137/516.29; 137/902; 277/538; 277/553; 277/605; 277/645; 277/647
(58) Field of Classification Search
  CPC ....... F16K 47/02; F16K 47/023; F16K 47/00; F16K 15/026; F16K 15/063; F04B 53/102; F04B 53/1022; F04B 53/1025; F04B 53/1027; F04B 53/1032; F04B 53/1035
  USPC ........... 251/332, 356–358, 366–367, 318, 12, 251/48, 77, 80, 120, 334, 64; 137/516.29, 137/902; 277/530, 538, 553, 605, 645, 647
  See application file for complete search history.

(56) References Cited

U.S. PATENT DOCUMENTS 767,118 A   8/1904  Popham et al.
829,546 A   8/1906  Schou
(Continued)

FOREIGN PATENT DOCUMENTS

DE          20300159 U1 *  3/2003

OTHER PUBLICATIONS

Introduction to Impulse Hammers, Internet download Sep. 2011 from Dytran Instruments, Inc.

*Primary Examiner* — John K Fristoe, Jr.
*Assistant Examiner* — Marina Tietjen
(74) *Attorney, Agent, or Firm* — Dennis W. Gilstad

(57) ABSTRACT

A tunable valve assembly reduces valve-generated vibration. One embodiment comprises a valve body and valve seat having substantially collinear longitudinal axes. A rebound characteristic frequency is associated with rebound of the elastic valve body base plate from forceful contact with the valve seat. A central cavity in the valve body encloses a spring-mass damper optionally immersed in a dilatant liquid and having a damper resonant frequency approximating a pump housing resonance. A lateral support assembly adjustably secured to the valve seat has a support resonant frequency designed in conjunction with the rebound characteristic frequency and the damper resonant frequency. Combined hysteresis heat loss associated with the above three vibration frequencies is reflected in lower closing energy impulse amplitude and damping of associated vibrations. Compliance of the elastic valve body base plate mating with the valve seat increases closing energy impulse duration and narrows the corresponding induced vibration spectrum.

4 Claims, 4 Drawing Sheets

(56) References Cited

U.S. PATENT DOCUMENTS

| | | | |
|---|---|---|---|
| 1,705,800 | A | 3/1929 | Akeyson |
| 1,716,896 | A | 6/1929 | Miller |
| 1,733,180 | A | 10/1929 | Biedermann |
| 2,002,672 | A | 5/1935 | Melott |
| 2,011,547 | A | 8/1935 | Campbell |
| 2,018,288 | A | 10/1935 | Steirly |
| 2,178,876 | A | 11/1939 | MacClatchie |
| 2,298,632 | A | 10/1942 | Thorner |
| 2,329,576 | A | 9/1943 | Anderson |
| 2,446,196 | A | 8/1948 | Sitney |
| 2,792,016 | A | 5/1957 | Shellman et al. |
| 3,004,633 | A | 10/1961 | Hobson |
| 3,053,500 | A | 9/1962 | Atkinson |
| 3,053,501 | A | 9/1962 | Varga |
| 3,054,422 | A | 9/1962 | Napolitano |
| 3,540,472 | A | 11/1970 | Brady et al. |
| 3,617,589 | A | 11/1971 | Jones-Hinton et al. |
| 3,951,849 | A | 4/1976 | Vickery et al. |
| 4,088,301 | A | 5/1978 | Ehmig |
| 4,103,909 | A | 8/1978 | Hoffman et al. |
| 4,181,027 | A | 1/1980 | Talbott, Jr. |
| 4,254,792 | A | 3/1981 | Schadel |
| 4,269,419 | A | 5/1981 | Brant |
| 4,300,775 | A | 11/1981 | Ringel |
| 4,572,519 | A | 2/1986 | Cameron et al. |
| 4,687,421 | A | 8/1987 | Cameron et al. |
| 4,759,428 | A | 7/1988 | Seshimo |
| 4,852,533 | A | 8/1989 | Doncker et al. |
| 4,860,995 | A | 8/1989 | Rogers |
| 4,951,707 | A | 8/1990 | Johnson |
| 5,073,096 | A | 12/1991 | King et al. |
| 5,088,521 | A | 2/1992 | Johnson |
| 5,091,455 | A | 2/1992 | Blank et al. |
| 5,158,162 | A | 10/1992 | Fink et al. |
| 5,183,863 | A | 2/1993 | Nakamura et al. |
| 5,226,445 | A | 7/1993 | Surjaatmadja |
| 5,238,744 | A | 8/1993 | Williams et al. |
| 5,249,600 | A | 10/1993 | Blume |
| 5,262,232 | A | 11/1993 | Wilfong et al. |
| 5,275,204 | A | 1/1994 | Rogers et al. |
| 5,370,150 | A | 12/1994 | Nehm |
| 5,431,186 | A | 7/1995 | Blume |
| 5,507,477 | A | 4/1996 | Manning et al. |
| 5,580,068 | A | 12/1996 | Gundy |
| 5,629,503 | A | 5/1997 | Thomasen |
| 5,639,098 | A | 6/1997 | MacDonald |
| 5,670,006 | A | 9/1997 | Wilfong et al. |
| 5,799,953 | A | 9/1998 | Henderson |
| 5,979,242 | A | 11/1999 | Hobbs |
| 6,000,677 | A | 12/1999 | Cook et al. |
| 6,026,776 | A | 2/2000 | Winberg |
| 6,056,270 | A | 5/2000 | Zimmerly |
| 6,290,205 | B1 | 9/2001 | Haga et al. |
| 6,293,514 | B1 | 9/2001 | Pechoux et al. |
| 6,331,578 | B1 | 12/2001 | Turner et al. |
| 6,432,320 | B1 | 8/2002 | Bonsignore et al. |
| 6,701,529 | B1 | 3/2004 | Rhoades et al. |
| 6,713,438 | B1 | 3/2004 | Baillargeon et al. |
| 6,959,727 | B2 | 11/2005 | Krishnamoorthy et al. |
| 7,081,223 | B2 | 7/2006 | Khoury |
| 7,222,837 | B1 | 5/2007 | Blume |
| 7,287,545 | B2 | 10/2007 | Zelson |
| 7,429,220 | B2 | 9/2008 | Kuntimaddi et al. |
| 7,513,483 | B1 | 4/2009 | Blume |
| 7,513,759 | B1 | 4/2009 | Blume |
| 7,591,450 | B1 | 9/2009 | Blume |
| 7,608,314 | B2 | 10/2009 | Plant |
| 7,794,827 | B2 | 9/2010 | Palmer et al. |
| 7,847,057 | B2 | 12/2010 | Müller et al. |
| 7,942,603 | B2 | 5/2011 | Miller |
| 2004/0226616 | A1 | 11/2004 | Vicars |
| 2005/0084229 | A1 | 4/2005 | Babbitt et al. |
| 2005/0206096 | A1 | 9/2005 | Browne et al. |
| 2007/0025811 | A1 | 2/2007 | Wilhelm |
| 2007/0138423 | A1 | 6/2007 | Smith |
| 2008/0135361 | A1* | 6/2008 | Zhou et al. ............ 188/267 |
| 2008/0279706 | A1 | 11/2008 | Gambier et al. |
| 2010/0072413 | A1 | 3/2010 | Koyomogi |
| 2011/0240064 | A1 | 10/2011 | Wales et al. |
| 2011/0250084 | A1* | 10/2011 | Marica ............ 417/540 |
| 2012/0035309 | A1 | 2/2012 | Zhu et al. |
| 2012/0136356 | A1 | 5/2012 | Doherty et al. |
| 2013/0019955 | A1 | 1/2013 | Bagagli et al. |

* cited by examiner

TUNABLE VALVE ASSEMBLY

This application is a continuation-in-part of copending application Ser. No. 13/525,374, filed 18 Jun. 2012, which is a continuation-in-part of application Ser. No. 13/228,475 filed 9 Sep. 2011 (abandoned), which was a continuation-in-part of application Ser. No. 13/210,407, filed 16 Aug. 2011 (now U.S. Pat. No. 8,292,260 issued 23 Oct. 2012), which was a continuation-in-part of application Ser. No. 13/196,916, filed 3 Aug. 2011 (now U.S. Pat. No. 8,267,371 issued 18 Sep. 2012), all of which are incorporated by reference.

FIELD OF THE INVENTION

The invention relates generally to reciprocating high-pressure pumps, and more specifically to the valves of such pumps.

BACKGROUND

Reciprocating high-pressure pumps (commonly called frac pumps) are often used in oil and gas fields for hydraulic fracturing of rock formations to increase hydrocarbon yields. Such pumps are often truck-mounted for easy relocation from well-to-well. And they are usually designed in two sections: the (proximal) power section (herein "power end") and the (distal) fluid section (herein "fluid end"). Each pump fluid end comprises at least one subassembly (and typically three or more in a single fluid end housing), with each subassembly comprising a suction valve, a discharge valve, a piston/plunger, and a portion of (or substantially the entirety of) a pump fluid end subassembly housing (shortened herein to "pump housing" or "fluid end housing" or "housing" depending on the pump configuration).

For each pump fluid end subassembly, its pump housing comprises a pumping chamber in fluid communication with a suction bore, a discharge bore, and a piston/plunger bore. A suction valve (i.e., a check valve) within the suction bore, together with a discharge valve (i.e., another check valve) within the discharge bore, control bulk fluid movement from suction bore to discharge bore via the pumping chamber. Pulsatile fluid flow through the pump results from periodic pressurization of the pumping chamber by a reciprocating plunger or piston within the piston/plunger bore. The resulting suction and pressure strokes alternately produce wide pressure swings in the pumping chamber (and across the suction and discharge valves) as the reciprocating plunger or piston is driven by the pump power end.

Such pumps are operated at peak pumped-fluid pressures in current practice up to about 15,000 psi, while simultaneously being weight-limited due to the carrying capacity of the trucks on which they are mounted. See, e.g., U.S. Pat. No. 7,513,759 B1, incorporated by reference.

Due to high peak pumped-fluid pressures, suction valves experience particularly wide pressure variations between a suction stroke, when the valve opens, and a pressure stroke, when the valve closes. For example, during a pressure stroke a valve body may be driven longitudinally toward contact with its corresponding valve seat with total valve closing force that may vary from about 50,000 to over 150,000 pounds (depending on pumped-fluid pressure and valve body transverse area). Valve-closure impact energy, in the form of a short-duration high-amplitude valve-closure impulse, thus constitutes a mechanical shock affecting the valve body, the valve seat, and the housing in which the valve is installed.

A mechanical shock can be represented in the time domain by an impulse plot (acceleration vs. time), and in the frequency domain by a vibration spectrum (amplitude vs. frequency). The shock of valve-closure impact is particularly prominent (i.e., comprising relatively high acceleration values) when it occurs as a conventionally-rigid valve body contacts a conventional frusto-conical valve seat. The valve body's longitudinal movement typically stops abruptly, together with the associated longitudinal movement of a proximal mass of pressurized fluid in contact with the valve body. The kinetic energy of the moving valve body and pressurized fluid is thus nearly instantly converted to a high-amplitude valve-closure impulse of short duration. The effect may be compared to striking the valve seat repeatedly with a commercially-available impulse hammer configured to produce relatively broad-spectrum high-frequency excitation (i.e., vibration) in an object struck by the hammer (see, e.g., *Introduction to Impulse Hammers* at http://www.dytran.com/img/tech/a11.pdf)

Thus, relatively broad-spectrum high-frequency vibration predictably results from the high-energy valve-closure impulse typically experienced by a conventionally-rigid valve body contacting a conventional frusto-conical valve seat. Nearly all of this vibration energy is quickly transmitted, via the valve seat, to proximate areas of the pump housing where it can be expected to excite damaging resonances that predispose the housing to fatigue failures. See, e.g., U.S. Pat. No. 5,979,242, incorporated by reference. Frac pump maintenance costs are known in the well-service industry to be relatively high and growing, due to both rapid valve wear and the early emergence of structurally significant cracks suggestive of corrosion fatigue in the pump housing (particularly near the suction valve seat deck).

Proposed valve designs in the past have included relatively lighter valve bodies comprising lighter materials and/or one or more interior cavities. See, e.g., U.S. Pat. No. 7,222,837 B1, incorporated by reference. Notwithstanding the somewhat lower valve-closure impulse amplitudes theoretically associated with such lighter valve bodies, they have been less popular than heavier and substantially more rigid valve bodies. The latter valve bodies have historically been shown to be relatively durable, but that performance record was largely created in lower pressure applications where the vibration fatigue issues described above are less prominent.

The recent transition period from lower pressure pump applications to higher pressure applications generally might be compared to the transition from slow-turning two-cylinder automobile engines to higher-speed and higher-powered inline six-cylinder engines around the years 1903-1910. New engine failure modes became evident, though they were neither anticipated nor understood at the time. Whereas the earlier engines had been under-powered but relatively reliable, torsional crankshaft vibrations in the six-cylinder engines caused objectionable noise ("octaves of chatter from the quivering crankshaft") and unexpected catastrophic failures (e.g., broken crankshafts). (Quotation cited on p. 13 of *Royce and the Vibration Damper*, Rolls-Royce Heritage Trust, 2003). The vibration problems, though never entirely eliminated, were finally reduced to manageable levels after several crankshaft redesigns and the development of crankshaft vibration dampers pioneered by Royce and Lanchester.

Analogously, new fluid-end-related designs are needed now for reducing fluid end fatigue failures associated with valve-generated vibration. Repeatedly-applied valve-closure energy impulses must be modified and/or vibrations damped to reduce the excitation of destructive vibration resonances in valves, pump housings, and related fluid end structures.

SUMMARY OF THE INVENTION

A tunable valve assembly reduces valve-generated vibration through attenuation and damping. One embodiment comprises a valve body and valve seat having substantially collinear longitudinal axes. A rebound characteristic frequency is related to the rebound cycle time associated with deformation of the valve body's elastic base plate as it forcefully strikes the valve seat and recovers. The compliance of the base plate during mating with the valve seat functions to increase closing energy impulse duration and thereby narrow the corresponding induced vibration spectrum (termed "attenuation" herein).

Vibration attenuation and damping are both accomplished in part by converting valve-closure energy to heat. Attenuation results from frequency-selective spectrum-narrowing modification of the valve-closure (or closing-energy) impulses that occur with each pump cycle. So attenuation effectively limits the bandwidth(s) of valve-generated vibration by relative reductions of higher frequency amplitudes. Damping, on the other hand, converts a portion of this band-limited vibration to heat. Both attenuation and damping are dependent in part on constraints causing shear-stress alteration (that is, "tuning") imposed on one or more viscoelastic and/or shear-thickening materials. Additionally, hysteresis associated with mechanical compliance of certain structures (e.g., peripheral seals, valve bodies or springs) may aid in converting vibration energy to heat. Resonant frequencies are shifted (or tuned) in each case to approximate predetermined values corresponding to measured or estimated pump or fluid end housing resonant frequencies (herein termed "critical" frequencies).

The functions of selective vibration attenuation and damping in tunable fluid ends are particularly beneficial because they focus the functions of vibration-limiting resources (e.g., tunable components) on minimization of vibration energy present in the fluid end near its housing's critical frequencies. Cost and complexity of tunable components are thus minimized while the efficacy of each tunable component's function (i.e., vibration limitation at particular frequencies) is enhanced. Stated another way, a tunable component's selective vibration attenuation and damping are optimized using metrics including cost, complexity, and damping factor (or degree of damping).

In continuous pump operation, mechanical compliance associated with vibration attenuation is manifest in elastic valve body and peripheral seal flexures secondary to repetitive longitudinal compressive forces (i.e., plunger pressure strokes). Each such flexure is followed by an elastic rebound, the duration of the entire flexure-rebound interval being termed "rebound cycle time." The inverse of rebound cycle time is termed "rebound characteristic frequency." Cumulative energy loss in the form of heat (e.g., hysteresis loss plus friction loss) is continuously transported for redistribution within the valve body and eventual rejection to the valve body surroundings (including, e.g., the pumped fluid). This heat, which is substantially lost to the valve body surroundings, represents a reduction in the energy content (and thus the damage-causing potential) of the valve-closure energy impulse applied to the pump housing.

Note that lengthening rebound cycle time to beneficially narrow (i.e., attenuate) the valve-generated vibration spectrum is accomplished in various invention embodiments using mechanical/hydraulic/pneumatic analogs of electronic wave-shaping techniques. For example, lengthened rebound cycle time is substantially influenced by the valve assembly's increased longitudinal compliance associated with the rolling contact (i.e., comprising seal and valve body flexure and rebound) described herein between the valve body/seal and the valve seat.

To complement the vibration attenuation described above, a central cavity in the valve body encloses a nonlinear spring-mass damper optionally immersed in a shear-thickening liquid (sometimes called a dilatant liquid). The damper has at least a first predetermined resonant frequency approximating a pump housing resonant frequency. Further vibration damping is provided in certain embodiments via an optional adjustable lateral support assembly comprising first and second securable end spacers in combination with a plurality of circular viscoelastic support elements, each support element comprising a support circumferential tubular area. A lateral support assembly may be adjustably secured to the valve seat and, if present, it has a predetermined resonant frequency which is typically similar to the damper's first predetermined resonant frequency but may instead replicate a different pump housing resonant frequency.

The rebound characteristic frequency, in contrast, is typically lower than the damper's first predetermined resonant frequency in order to more substantially narrow the bandwidth of the valve-closure energy impulse vibration spectrum. The combined hysteresis heat loss associated with the damper, lateral support, and rebound characteristic frequencies is reflected in an overall reduction of closing energy impulse amplitude, together with damping of associated vibrations.

In addition to features of a tunable valve assembly described above, the valve body comprises a peripheral seal retention groove, a peripheral valve seat interface, and at least one guide (e.g., a top guide stem and/or a crow-foot guide). Further, when present in the central cavity the dilatant liquid facilitates tuning the damper to a plurality of predetermined frequencies to effectively reduce "ringing" (i.e., vibration) of the valve body induced by a valve closing energy impulse. The dilatant liquid also tends to prevent "bottoming" of the damper's mass during the sudden valve body deceleration associated with a closing energy impulse. These two functions act to reduce the vibration energy transmitted to a pump housing via the valve seat of an individual valve.

For illustrative purposes, the Figures herein show a valve body's central internal cavity which is substantially enclosed by a proximal valve body portion and a distal elastic valve body base plate. The Figures are schematic representations only, and they are not intended to imply a particular valve assembly embodiment and/or fabrication technique(s) to the exclusion of others which, in light of the disclosure herein, would be evident to those skilled in the art.

Regardless of the invention embodiment or its fabrication technique(s), a tunable valve assembly of the invention narrows the bandwidth of valve-generated vibration and also damps the vibration. Damping results in part from hysteresis heat loss due to compliance of the elastic valve body base plate, as well as from heat loss associated with operation of the nonlinear spring-mass damper and the lateral support assembly (if present). The combined heat loss is reflected in reduction of closing energy impulse amplitude, as well as damping of induced valve body vibrations. Compliance is exhibited by the elastic valve body base plate upon contact of its peripheral valve seat interface with a valve seat during valve closure. This compliance effectively increases the duration of a closing energy impulse. And the increased impulse duration results in narrowing of the corresponding induced vibration spectrum. Such vibration reductions, and the associated reductions in metal fatigue and corrosion susceptibility, are especially beneficial in cases where the fluid being pumped is corrosive.

Vibration spectrum narrowing may be augmented when an elastomeric seal is installed in the peripheral seal retention.

And hysteresis loss within the elastomeric seal can further contribute to the advantages conferred by a tunable valve assembly of the invention. Heat dissipated within the elastomeric seal subtracts from the total closing impulse energy available to excite destructive vibration. And since the vibration damping properties of the tunable valve assembly can be tailored to more closely match those of the seal, potentially destructive vibration frequencies may be damped by either the assembly or the seal or both. More broadly, the nonlinear spring-mass damper of the tunable valve assembly can be tuned (e.g., adjusted through choice of dilatant liquid in the central cavity) to work most beneficially with several other components of the pump, such as an elastomeric seal and/or the valve seat, to optimize overall reductions of destructive induced vibration.

Note that a variety of optimization strategies for attenuation and damping may be employed in specific cases, depending on parameters such as the Q (or quality) factor attributable to each fluid end resonance. Lower Q connotes a relatively broader band of near-resonant frequencies, while higher Q connotes a narrower band (ideally, a single frequency). Since ideal fluid end resonances are not encountered in practice, optimization strategies typically include choice of the Q of the tunable component in light of the Q of the fluid end resonance of interest. In tunable components of the invention, choice of Q depends on both materials and structure, especially structural compliances and the properties of viscoelastic and/or shear-thickening materials present in the component(s). Further, the center (or representative) frequency of a tunable component or a fluid end resonance may not be unambiguously obtainable. Thus, optimization of tunable component vibration damping may be an iterative process and may not be characterized by a single-valued solution. Note also that tunable component resonant frequencies may be intentionally "detuned" or adjusted to slightly different values from nominal housing resonant (or center) frequencies in pursuit of an overall optimization strategy.

To minimize fluid end fatigue failures then, resonant frequencies of each tunable component of the invention are adjusted (i.e., tuned) using both analytical and empirical frequency measures. Such measures are considered in light of the resonant frequencies of any other tunable component(s) present, and also in light of critical resonances of the fluid end itself. The objective is optimal attenuation and damping of the most destructive portion(s) of valve-generated vibration. In each case, optimal vibration limitation will be dependent on the component's capacity to dissipate heat generated by hysteresis and/or fluid turbulence. Thus, certain predetermined portion(s) of valve-closure energy are dissipated at one or more predetermined pump housing resonant (critical) frequencies. Note that the critical frequencies proximate to a pump housing suction bore may differ, for example, from the critical frequencies proximate to the same pump housing's plunger bore due to the different constraints imposed by structures proximate the respective bores. Such differences are accounted for in the adjustment of tunable components, particularly tunable valve seats and tunable plunger seals.

A tunable valve assembly is thus designed to integrate the functions of various valve body and pump structural features with functions of the nonlinear spring-mass damper. See, e.g., U.S. Pat. No. 6,026,776, incorporated by reference. Further, the nonlinear spring-mass damper, acting through shearing forces exerted on a dilatant liquid by flexure and rebound of adjacent Belleville springs, dissipates an additional portion of closing impulse energy as heat while damping vibration. The interactions contribute to what has been termed "shear" damping (see, e.g., U.S. Pat. No. 5,670,006, incorporated by reference).

Overall heat loss in the nonlinear spring-mass damper combines with heat loss in the valve body to selectively reduce the amplitude and duration of vibrations that a closing energy impulse would otherwise tend to excite in a pump housing. Heat energy lost (i.e., dissipated) in the nonlinear spring-mass damper during such shearing movement is subtracted from the total closing impulse energy otherwise available to excite destructive flow-induced vibration resonances in the valve, valve seat and/or pump housing. See, e.g., U.S. Pat. No. 5,158,162, incorporated by reference.

A different type of interaction of a nonlinear spring-mass damper with a plurality of spring-supported masses may also contribute to vibration damping in a valve assembly. If a plurality of masses within the nonlinear spring-mass damper are not longitudinally fixed but merely guided within the nonlinear spring-mass damper, the (relatively dense) masses may experience a longitudinal movement phase lag with respect to other parts of a valve assembly (analogous in part to the outer ring movement in an automotive elastomeric damper or the antiphase movement of small masses in an automotive pendulum damper). See, e.g., the '776 patent cited above. Different embodiments of the invention employ various combinations of the above mass interactions, in combination with other valve assembly design features described herein, to achieve effective vibration damping at specific frequencies of interest (e.g., pump housing resonant frequencies). Note that the degree of each phase lag exhibited by a particular tunable valve assembly embodiment may be tuned to pump frequencies of interest in a manner analogous in part to the tuning of automotive vibration dampers in particular piston engine configurations.

Specific desired properties for each nonlinear spring-mass damper component arise from a design concept requiring coordinated functions depending on the location and vibration-related properties of each portion of the valve body surrounding the damper. The nonlinear spring-mass damper immersed in a dilatant liquid aids longitudinal compliance of the valve body because it viscoelastically accommodates longitudinal (i.e., concave) deformation of the valve body base plate. Hysteresis in the nonlinear spring-mass damper and the valve body as a whole (including, e.g., the elastic valve body base plate) further reduces closing energy impulse amplitude through dissipation of a portion of impulse energy as heat.

Elastic longitudinal compliance of a tunable valve assembly results in part from elastic properties of the materials comprising the tunable valve body. Such elastic properties may be achieved through use of composites as, for example, in an elastic valve body base plate comprising steel, carbon fiber reinforced polymer, carbon nanotube reinforced polymer, and/or carbon nanotube reinforced metal matrix. The polymer may comprise a polyaryletherketone (PAEK), for example, polyetheretherketone (PEEK). See, e.g., U.S. Pat. No. 7,847,057 B2, incorporated by reference.

A more detailed consideration of elastic compliance in an tunable valve assembly is described below. As a closing energy impulse is applied to a tunable (suction) valve assembly, substantially central longitudinal deformation of the tunable valve body occurs. And such deformation is associated with elastic bending of the valve body base plate into a concave or bowl-shaped valve body flexure as noted above and further described below. This concave flexure results from internal pumped-fluid pressure acting substantially equally across the valve body transverse plane (i.e., resulting in fluid forces substantially perpendicular to the plane of the elastic valve body base plate), while the valve seat exerts force generally in the opposite direction through the valve seat interface. Since the valve seat interface is peripheral to the valve body base plate, the base plate tends to flex (elastically and generally centrally) while the peripheral valve seat interface is restrained by its contact with the valve seat.

The description of valve body flexure as concave or bowl-shaped refers to a view from the proximal or high-pressure side of the valve body. Such flexure is substantially elastic and may be associated with slight circular rotation (i.e., a circular rolling contact) of the valve body's valve seat interface with the valve seat itself. When the degree of rolling contact is sufficient to justify conversion of the valve seat interface from the traditional frusto-conical shape to a convex curved shape (which may include circular, elliptic and/or parabolic portions), a correspondingly-curved concave valve seat may be used. Such rolling contact, when present, augments elastic formation of the bowl-shaped valve body flexure on the pump pressure stroke, reversing the process on the suction stroke.

The circular rolling contact described herein may be visualized by considering the behavior of the convex valve seat interface as the valve body experiences bowl-shaped flexure (i.e., the transformation from a relatively flat shape to a bowl shape). During such flexure the periphery of the valve seat interface rotates inwardly and translates proximally (relative to the valve body's center of gravity) to become the proximal rim of the bowl-shaped flexure.

While substantially elastic, each such valve body flexure is associated with energy loss from the closing energy impulse in the form of heat due to hysteresis of the valve body. Frictional heat loss (and any wear secondary to friction) associated with any circular rolling contact of the convex valve seat interface with the concave valve seat is relatively low. Thus, the rolling action, when present, minimizes wear that might otherwise be associated with substantially sliding contact of these surfaces. Further, when rolling contact between valve body and valve seat is present during both longitudinal valve body flexure and the elastic rebound which follows, trapping of particulate matter from the pumped fluid between the rolling surfaces tends to be minimized.

In addition to the above-described heat loss associated with hysteresis secondary to flexure in portions of a tunable valve body (including, e.g., an elastic valve body base plate), hysteresis loss will also occur during pressure-induced movements of components of the nonlinear spring-mass damper (in association, e.g., with valve closure and base plate flexure/rebound). Spring flexure/rebound and related mass movements will in general be associated with additional hysteresis heat loss. Indeed, the mass itself may be designed to flex under relatively high accelerations as seen, for example, during valve closure. In such embodiments the mass may comprise composites of substantially elastic materials (e.g., carbon fiber and/or aramid fiber) with viscoelastic materials (e.g., polymers or interpenetrating polymer networks). Mass flexure may then occur simultaneously with spring flexure within a nonlinear spring-mass damper, with the potential for beneficial heat loss (and consequent vibration damping) over a range of frequencies.

Another aspect of the formation of a bowl-shaped valve body flexure under the influence of a closing energy impulse is that the momentum of pumped fluid which moves in contact with the valve body is smoothly redirected (at least in part) laterally and proximally by the concave proximal valve body surface. Forces due to oppositely directed radial components of the resultant fluid flow tend to cancel, and energy lost as heat in pumped fluid turbulence is subtracted from that of the closing energy impulse, thus decreasing its amplitude.

The above-described energy loss and the time required for valve body longitudinal deformation and rebound to take place (rebound cycle time), are associated with dissipation of closing impulse energy. A closing energy impulse applied to a tunable valve assembly is thus relatively lower in amplitude and longer in duration (e.g., having longer rise and/or fall times) than an analogous closing energy impulse applied to a conventionally stiff valve body which closes on a conventional frusto-conical valve seat. Longer duration impulses are associated with longer rebound cycle times, which correspond to lower rebound characteristic frequencies. The combination of lower amplitude and increased duration of the closing energy impulse results in a narrowed vibration bandwidth due to the loss of relatively higher frequencies. Hence, the potential for induction of damaging resonances in the valve, valve seat, and adjacent portions of the pump housing is reduced. See, e.g., the above-cited '242 patent.

Note that in describing the behavior of certain polymers herein under elevated heat and pressure, the term "polymer" includes relatively homogenous materials (e.g., a single-species fluid polymer) as well as composites and combination materials containing one or more of such relatively homogenous materials plus finely divided particulate matter (e.g., nanoparticles) and/or other dispersed species (e.g., species in colloidal suspension) to improve heat scavenging and/or other properties. See, e.g., U.S. Pat. No. 6,432,320 B1, incorporated by reference.

For polymers that may be incorporated in a nonlinear spring-mass damper as noted above, optimal damping is associated with relatively high storage modulus and loss tangent values, and is obtained over various temperature ranges in multicomponent systems described as having macroscopically phase-separated morphology, microheterogeneous morphology, and/or at least one interpenetrating polymer network. See, e.g., the above-cited '006 patent and U.S. Pat. Nos. 5,091,455; 5,238,744; 6,331,578 B1; and 7,429,220 B2, all incorporated by reference.

Briefly summarizing salient points of the above description, recall first that vibration attenuation and damping in a tunable valve assembly of the invention operate via four interacting mechanisms. First, impulse amplitude is reduced by converting a portion of total closing impulse energy to heat (e.g., via hysteresis and fluid turbulence), which is then ultimately rejected to the valve body surroundings (e.g., the pumped fluid). Each such reduction of impulse amplitude means lower amplitudes in the vibration spectrum transmitted to the pump housing.

Second, the closing energy impulse as sensed at the valve seat is reshaped (e.g., by lengthening the cycle time associated with peripheral valve seal compression, concave valve body flexure and elastic rebound). Such reshaping may in general be accomplished using mechanical/hydraulic/pneumatic analogs of electronic wave-shaping techniques. In particular, lengthened rebound cycle time is substantially influenced by the valve body's increased longitudinal compliance associated with the rolling contact/seal and concave valve body flexure described herein between valve body and valve seat. The units of lengthened rebound cycle times are seconds, so their inverse functions have dimensions of per second (or 1/sec), the same dimensions as frequency. Thus, as noted above, the inverse function is termed rebound characteristic frequency.

Lowered rebound characteristic frequency (i.e., increased rebound cycle time) corresponds to slower rebound, with a corresponding reduction of the impulse's bandwidth due to loss (or reduction) of relatively higher frequency energy content (i.e., bandwidth narrowing). This condition may be estimated graphically (see, e.g., *Introduction to Impulse Hammers* cited above), and is created during impulse hammer testing by adding to hammer head inertia and by use of softer impact tips of plastic (instead of the metal tips used when higher frequency excitation is desired). In contrast, tunable valve assemblies achieve bandwidth narrowing (and thus reduction of the damage potential of induced higher-frequency vibrations) at least in part through increased longitudinal compliance. In other words, bandwidth narrowing is achieved in embodiments of the invention through an increase of the effective impulse duration (as by, e.g., slowing the impulse's rise time and/or fall time as the valve assembly's components flex and relax (i.e., rebound) over a finite time interval).

Third, induced vibration resonances of the tunable valve assembly, valve seat, and/or pump housing structures (e.g., tunable valve seats and/or tunable plunger seals) are effectively damped by interactions generating hysteresis in tunable components (e.g., the spring-mass damper) as well as fluid turbulence, thus dissipating heat in the pumped fluid.

And fourth, the potential for excitation of damaging resonances in pump vibration induced by a closing energy impulse is further reduced through narrowing of the impulse's vibration bandwidth by increasing the valve body's effective inertia without increasing its actual mass. Such an increase of effective inertia is possible because a portion of pumped fluid moves with the valve body as it flexes in response to longitudinal compression. The mass of this portion of pumped fluid is effectively added to the valve body's mass during the period of flexure/rebound, thereby increasing the valve body's effective inertia to create a low-pass filter effect (i.e., tending to block higher frequencies).

To increase understanding of the invention, three embodiments are discussed herein only as illustrative examples. In a first invention embodiment an tunable valve assembly is described as comprising a valve body which has a longitudinal axis and comprises an elastic valve body base plate and a proximal valve body portion. A valve seat interface is located peripherally on the elastic valve body base plate. A central internal cavity is substantially enclosed by the valve body base plate and the proximal valve body portion, and the valve body has at least one peripheral seal-retention groove and at least one guide. The central internal cavity substantially encloses a nonlinear spring-mass damper.

As shown for example herein, the valve body may have a top guide stem centered on the proximal valve body portion. The nonlinear spring-mass damper may comprise at least one perforated (e.g., washer-shaped) mass and at least two Belleville springs immersed in dilatant liquid. The dilatant liquid may, in turn, comprise mineral oil and nanoparticles.

As noted above, the valve seat interface may have a convex curve to facilitate rolling contact with a valve seat. If it has a convex curve, the valve seat interface may have circular, elliptic and/or parabolic portions to match optionally corresponding portions on a mating valve seat. Such optional matching will tend to reduce wear and improve the rolling seal between valve seat interface and valve seat.

In a second invention embodiment an tunable valve body has at least one guide, a peripheral seal-retention groove, and a valve seat interface. The valve body substantially encloses an internal cavity, and the internal cavity substantially encloses a nonlinear spring-mass damper. The nonlinear spring-mass damper may be immersed in a dilatant liquid within the internal cavity, and the dilatant liquid may comprise mineral oil, at least one fibrous filler, at least one particulate filler, and/or nanoparticles.

A third invention embodiment is a method of making an tunable valve assembly, the method comprising two steps. The first step is providing a valve body having at least one guide, a peripheral seal retention groove, a substantially enclosed internal cavity, and a valve seat interface. And the second step is providing a nonlinear spring-mass damper substantially enclosed by said internal cavity. The first and second steps may be augmented by a third (or additional) step of immersing the nonlinear spring-mass damper in a dilatant liquid within said internal cavity for tuning the damper to a plurality of predetermined frequencies. And the dilatant liquid may comprise at least one particulate and/or at least one fibrous filler.

As noted above, various invention embodiments may comprise carbon fiber reinforced polymer, and the polymer may comprise PAEK. In the latter case, the polymer may comprise PEEK. Such an embodiment, combining high strength with flexibility and relatively light weight, demonstrates the beneficial effects described above.

Note also that during fabrication, internal valve body spaces may be formed by welding (e.g., inertial welding or laser welding) valve body portions together as in the above-cited '837 patent, or by separately machining such spaces with separate coverings. Valve body fabrication may also be by rapid-prototyping (i.e., layer-wise) techniques. See, e.g., the above-cited '057 patent. A polymeric element may be cast and cured in place in an tunable valve body as described herein. See, e.g., U.S. Pat. No. 7,513,483 B1, incorporated by reference.

DETAILED DESCRIPTION

Figure 1:
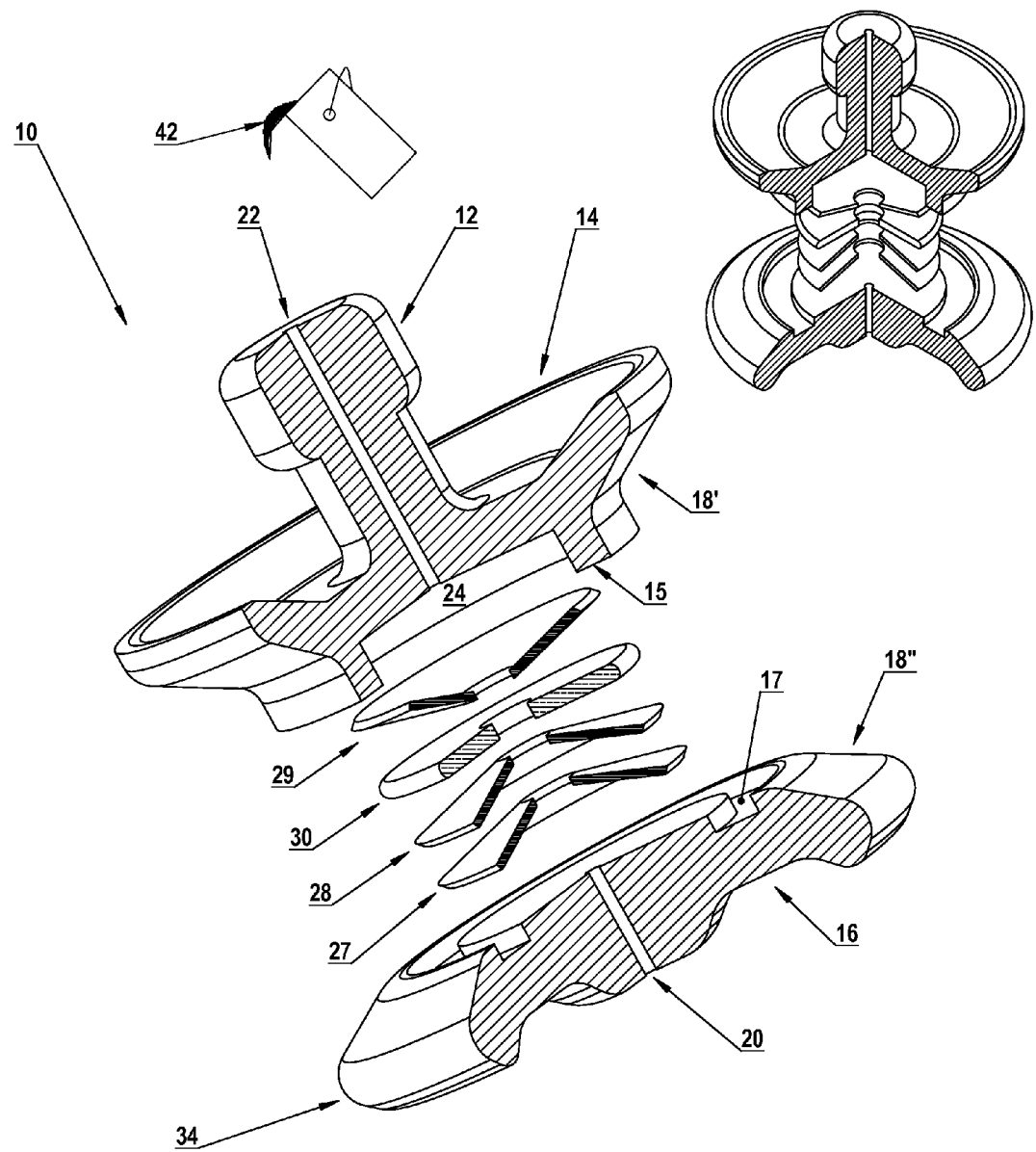
FIG. 1 is a schematic 3-dimensional exploded view of a partially sectioned tunable valve assembly embodiment. A dilatant (i.e., shear-thickening) liquid is schematically shown being added to a valve body's internal cavity, the cavity being shown as enclosing a tuned vibration damper.

A tunable valve assembly embodiment 10 (see FIGS. 1-3) comprises a valve body 14/16 which has a longitudinal axis and comprises an elastic valve body base plate 16 and a proximal valve body portion 14. A valve seat interface 34 is located peripherally on the elastic valve body base plate 16. A central internal cavity 24 (see FIG. 1) is substantially enclosed by the valve body base plate 16 and the proximal valve body portion 14, the valve body has at least one peripheral seal-retention groove 18'/18" and at least one guide 12. The central internal cavity 24 substantially encloses a nonlinear spring-mass damper 27/28/29/30.

FIG. 1 shows a schematic exploded view of a nonlinear spring-mass damper 27/28/29/30, which is further described below. Belleville springs 27/28/29 are nonlinear, and they couple mass 30 to the valve body base plate 16 and the proximal valve body portion 14. Additionally, dilatant liquid 42 (see FIG. 1) is optionally added (via sealable ports 22 and/or 20) to central internal cavity 24 to immerse nonlinear spring-mass damper 27/28/29/30. The nonlinear behavior of dilatant liquid 42 in shear (as, e.g., between Belleville springs 27 and 28) expands the range of tuning the nonlinear spring-mass damper 27/28/29/30 to a larger plurality of predetermined frequencies to reduce "ringing" of valve body 14/16 in response to a closing energy impulse.

To clarify the function of nonlinear spring-mass damper 27/28/29/30, mass 30 is shown perforated centrally to form a washer shape and thus provide a passage for flow of dilatant liquid 42 during longitudinal movement of mass 30. This passage is analogous to that provided by each of the Belleville springs 27/28/29 by reason of their washer-like shape.

Figure 2:
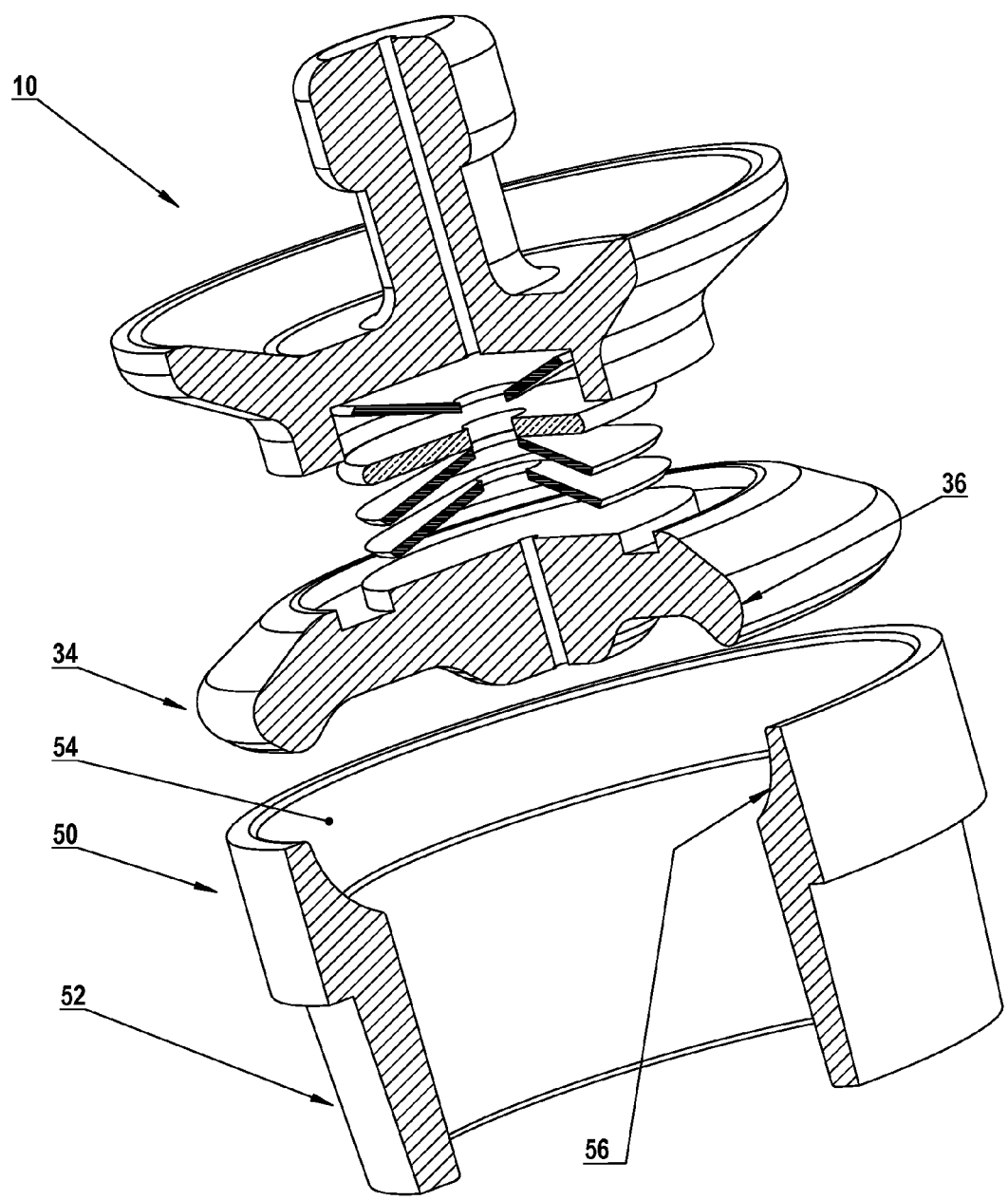
FIG. 2 is a schematic 3-dimensional exploded view of a first alternate tunable valve assembly comprising that of FIG. 1 together with a valve seat.
Figure 3:
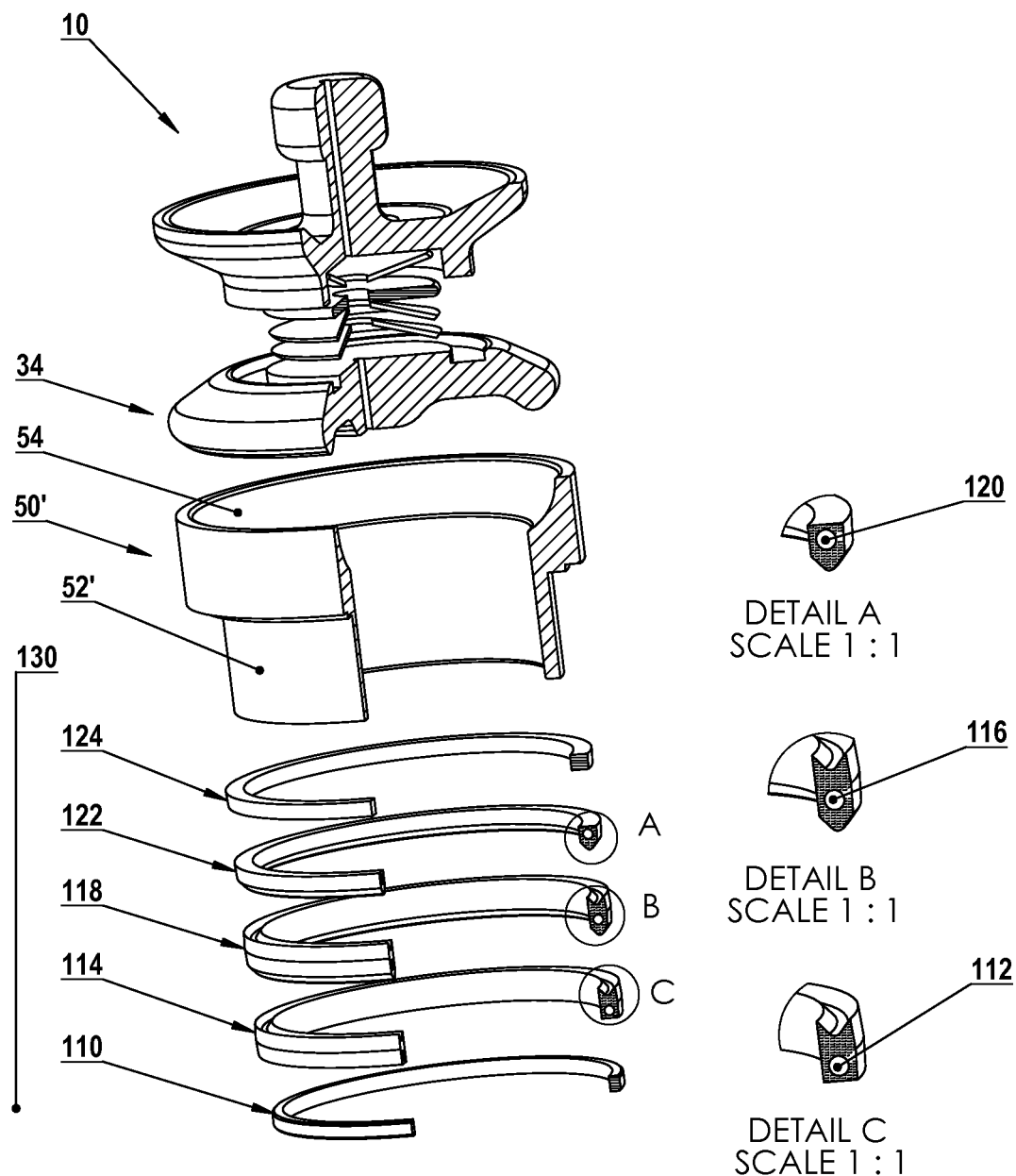
FIG. 3 is a schematic 3-dimensional exploded view of an alternate tunable valve assembly comprising that of FIG. 1 together with a tunable valve seat showing a mating surface longitudinally spaced apart from a lateral support mounting surface. An adjustable lateral support assembly is shown comprising first and second securable end spacers in combination with a plurality of circular viscoelastic support elements, each support element comprising a support circumferential tubular area.

FIG. 2 shows an exploded view of an alternate embodiment of a tunable valve assembly comprising the tunable valve assembly 10 of FIG. 1, plus a valve seat 50. FIGS. 2 and 3 schematically illustrate two views of an exploded partially-sectioned 3-dimensional view including a valve body 10 and its valve seat interface 34, together with mating surface 54 of valve seats 50 and 50'. Mating surface 54 is longitudinally spaced apart from pump housing interface surface 52 in FIG. 2, and from lateral support mounting surface 52' in FIG. 3. In FIG. 2, a curved longitudinal section edge 56 of the valve seat's mating surface 54, together with a correspondingly greater curved longitudinal section edge 36 of valve seat interface 34, are shown schematically to aid description herein of a rolling valve seal.

Note that valve body 14/16 may be fabricated by several methods, including that schematically illustrated in FIGS. 1 and 2. For example, circular boss 15 on proximal valve body portion 14 may be inertia welded or otherwise joined to circular groove 17 on valve body base plate 16. Such joining results in the creation of peripheral seal-retention groove 18'/18" having proximal groove wall 18' and distal groove wall 18".

To enhance scavenging of heat due to friction loss and/or hysteresis loss, liquid polymer(s) 42 may be augmented by adding nanoparticles which are generally invisible to the eye as they are typically dispersed in a colloidal suspension. Nanoparticles comprise, for example, carbon and/or metallic materials such as copper, beryllium, titanium, nickel, iron, alloys or blends thereof. The term nanoparticle may conveniently be defined as including particles having an average size of up to about 2000 nm. See, e.g., the '320 patent.

The correspondingly greater curvature of valve seat interface 34, as compared to the curvature of mating surface 54, effectively provides a rolling seal against fluid leakage which reduces wear on the surfaces in contact. The rolling seal also increases longitudinal compliance of a tunable suction or discharge valve of the invention, with the added benefit of increasing the rise and fall times of the closing energy impulse (thus narrowing the associated vibration spectrum).

Further regarding the term "correspondingly greater curvature" as used herein, note that the curvatures of the schematically illustrated longitudinal section edges (i.e., 36 and 56) and the surfaces of which they are a part (i.e., valve seat interface 34 and mating surface 54 respectively) are chosen so that the degree of longitudinal curvature of valve seat interface 34 (including edge 36) exceeds that of (i.e., has correspondingly greater curvature than) mating surface 54 (including edge 56) at any point of rolling contact. Hence, rolling contact between valve seat interface 34 and mating surface 54 is always along a substantially circular line, the plane of which is transverse to the (substantially coaxial) longitudinal axes of valve body 14/16 and valve seat 50.

Note that although valve seat interface 34 and mating surface 54 are schematically illustrated as curved, they may be at least partially frusto-conical in certain embodiments described herein.

The above discussion of rolling contact applies to the alternate valve seat 50' of FIG. 3, as it does to the valve seat 50 of FIG. 2. But the lateral support mounting surface 52' in FIG. 3 differs from pump housing interface surface 52 of FIG. 2 in that it facilitates adjustably securing a lateral support assembly 130 to alternate valve seat 50'. Lateral support assembly 130 comprises first and second securable end spacers (110 and 124 respectively) in combination with a plurality of circular viscoelastic support elements (114, 118 and 122), each support element comprising a support circumferential tubular area (112, 116 and 120 respectively).

Figure 4:
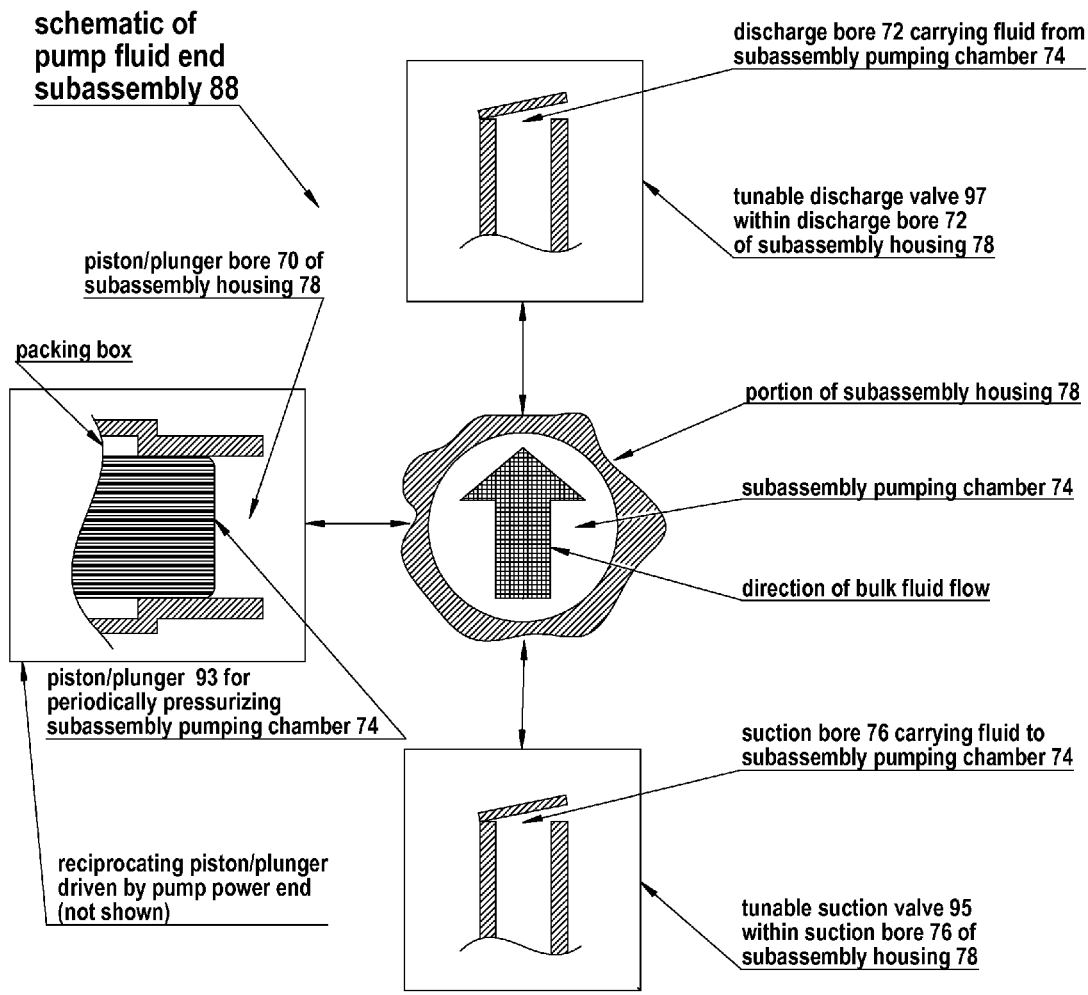
FIG. 4 is a schematic illustration of an exploded partially-sectioned 2-dimensional view of major components of a pump fluid end subassembly, together with brief explanatory comments on component functions. The schematically-illustrated subassembly comprises a pumping chamber within a subassembly pump housing, the pumping chamber being in fluid communication with a suction bore, a discharge bore, and a piston/plunger bore. Schematic representations of a suction valve, a discharge valve, and a piston/plunger are shown in their respective bores, together with brief annotations and graphical aids outlining the structural relationships.

Note also that in general, a tunable (suction or discharge) valve of the invention may comprise a combination of a tunable valve assembly 10 (see, e.g., FIG. 1) and a valve seat 50 (see, e.g., FIG. 2) or a valve seat 50' (see, e.g., FIG. 3). Referring more specifically to FIG. 4, tunable suction valve 95 is distinguished from tunable discharge valve 97 by one or more factors, including each measured resonant frequency to which each tunable valve is tuned so as to optimize the overall effectiveness of valve-generated vibration attenuation in the associated pump housing 78.

FIG. 4 is a schematic illustration of an exploded partially-sectioned 2-dimensional view of major components of a pump fluid end subassembly 88, together with graphical aids and brief explanatory comments on component functions. The schematically-illustrated subassembly 88 comprises a pumping chamber 74 within a subassembly (pump) housing 78, the pumping chamber 74 being in fluid communication with a suction bore 76, a discharge bore 72, and a piston/plunger bore 70. Note that piston/plunger bore 70 comprises at least one recess (analogous to that labeled "packing box" in FIG. 4) in which at least one lateral support assembly 130 (see FIG. 3) may be sealingly positionable along the plunger as part of a tunable plunger seal embodiment. Schematic representations of a tunable suction valve 95 (illustrated for simplicity as a check valve), a tunable discharge valve 97 (also illustrated for simplicity as a check valve), and a piston/plunger 93 (illustrated for simplicity as a plunger) are shown in their respective bores.

Regarding the graphical aids of FIG. 4, the double-ended arrows that signify fluid communication between the bores (suction, discharge and piston/plunger) and the pumping chamber are double-ended to represent the fluid flow reversals that occur in each bore during each transition between pressure stroke and suction stroke of the piston/plunger. The large single-ended arrow within the pumping chamber is intended to represent the periodic and relatively large, substantially unidirectional fluid flow from suction bore through discharge bore during pump operation.

Further regarding the graphical aids of FIG. 4, tunable suction (check) valve 95 and tunable discharge (check) valve 97 are shown only schematically as check valves in FIG. 4 because of their relative complexity. Construction details of embodiments of such check valves are shown in FIG. 2, each tunable check valve comprising a tunable valve assembly and a valve seat. In general, the tunable valve assemblies of tunable suction and discharge valves will typically be tuned to different assembly resonant frequencies because of their different positions in a subassembly housing 78 (and thus in a pump housing as described herein). Pump housing resonant frequencies that are measured proximate the tunable suction and discharge valves will differ in general, depending on the overall pump housing design. In each case they serve to guide the choices of the respective assembly resonant frequencies for the valves.

Note that the combination of major components labeled in FIG. 4 as a pump fluid end subassembly 88 is so labeled (i.e., is labeled as a subassembly) because typical fluid end configurations comprise a plurality of such subassemblies combined in a single machined block. Thus, in such typical (multi-subassembly) pump fluid end designs, as well as in less-common single-subassembly pump fluid end configurations, the housing is simply termed a "pump housing" rather than the "subassembly housing 78" terminology of FIG. 4.

Further as schematically-illustrated and described herein, each pump fluid end subassembly 88 comprises only major components: a pumping chamber 74, with its associated tunable suction valve 95, tunable discharge valve 97, and piston/plunger 93 in their respective bores 76, 72 and 70 of subassembly housing 78. For greater clarity of description, common fluid end features well-known to those skilled in the art (such as access bores, plugs, seals, and miscellaneous fixtures) are not shown. Similarly, a common suction manifold through which incoming pumped fluid is distributed to each suction bore 76, and a common discharge manifold for collecting and combining discharged pumped fluid from each discharge bore 72, are also well-known to those skilled in the art and thus are not shown.

Note that the desired check-valve function of tunable valves 95 and 97 schematically-illustrated in FIG. 4 requires interaction of the respective tunable valve assemblies with a corresponding (schematically-illustrated) valve seat (see FIG. 2). The schematic illustrations of FIG. 4 are only intended to convey general ideas of relationships and functions of the major components of a pump fluid end subassembly. Structural details of the tunable valve assemblies that are in turn part of tunable valves 95 and 97 of the invention (including their respective valve seats) are illustrated in greater detail in FIGS. 2 and 3. Such structural details facilitate a plurality of complementary functions that are best understood through reference to FIGS. 2 and 3.

The above complementary functions include, but are not limited to, closing energy conversion to heat, energy redistribution through rejection of heat to the pumped fluid and pump housing, vibration damping, selective vibration spectrum narrowing through changes in tunable valve assembly compliance, and selective vibration attenuation through energy dissipation (i.e., via redistribution) at predetermined assembly resonant frequencies.

What is claimed is:

1. A tunable valve assembly comprising a valve body and a valve seat having substantially collinear longitudinal axes, said valve seat comprising a lateral support assembly and said valve body having at least one guide, a peripheral seal retention groove, a peripheral valve seat interface, and an elastic valve body base plate;
   wherein said valve body substantially encloses an internal cavity;
   wherein said internal cavity substantially encloses a nonlinear spring-mass damper;
   wherein said valve seat comprises a mating surface longitudinally spaced apart from a lateral support mounting surface;
   wherein said lateral support assembly is adjustably secured on said lateral support mounting surface, said lateral support assembly having a first resonant frequency approximating a pump housing resonant frequency;
   wherein said damper has a second resonant frequency approximating said first resonant frequency; and
   wherein said valve body rebounds from said valve seat with a rebound characteristic frequency lower than said second resonant frequency.

2. The tunable valve assembly of claim 1 wherein said nonlinear spring-mass damper is immersed in a dilatant liquid within said internal cavity for tuning said damper to at least one predetermined frequency.

3. The tunable valve assembly of claim 2 wherein said dilatant liquid comprises at least one particulate filler.

4. The tunable valve assembly of claim 2 wherein said dilatant liquid comprises at least one fibrous filler.

* * * * *